Nov. 3, 1942. R. W. GILBERT 2,301,115
ELECTRICAL TACHOMETER
Filed Oct. 7, 1940
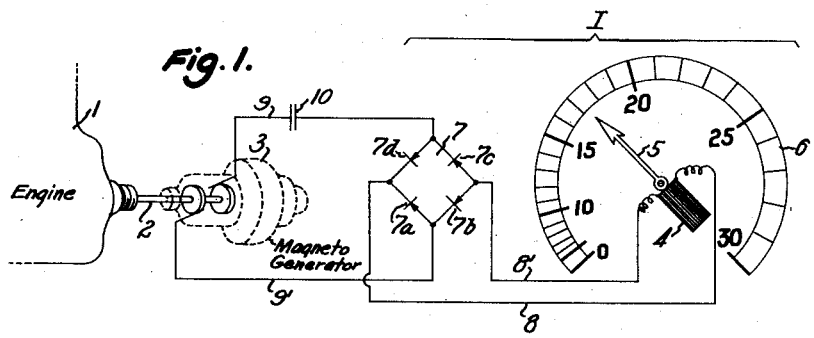
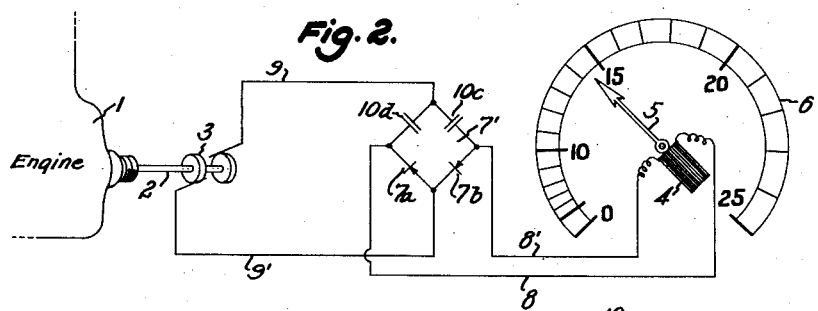
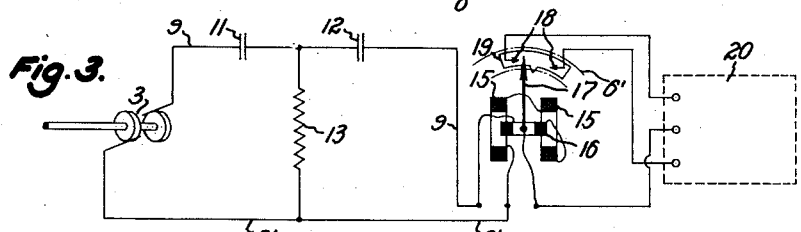
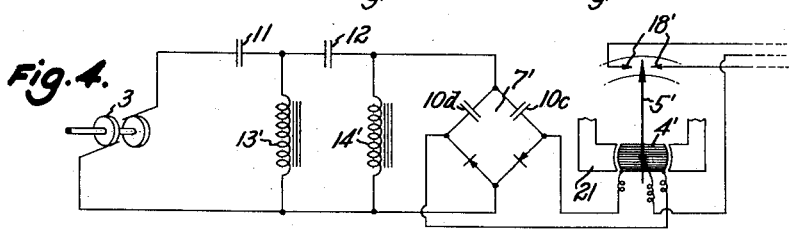
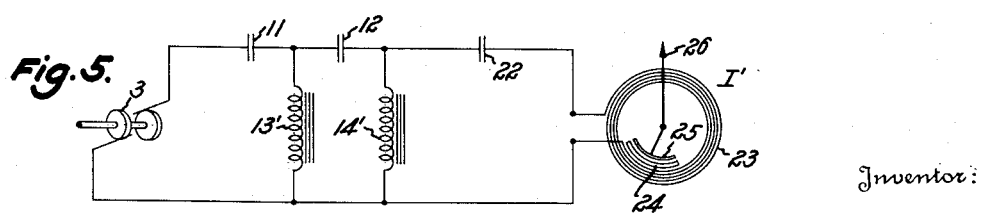
Inventor:
Roswell W. Gilbert,
By Potter, Pierce & Scheffler
Attorneys.

Patented Nov. 3, 1942

2,301,115

UNITED STATES PATENT OFFICE 2,301,115

ELECTRICAL TACHOMETER

Roswell W. Gilbert, Montclair, N. J., assignor to Weston Electrical Instrument Corporation, Newark, N. J., a corporation of New Jersey Application October 7, 1940, Serial No. 360,199

11 Claims. (Cl. 175—183)

This invention relates to electrically actuated tachometers which may be employed for indicating the angular or linear speed of a body and is particularly adapted for use in connection with aircraft engines wherein the engine speed in R. P. M. developed during run-up and take-off is used as an indication of whether the engine is delivering its full rated horsepower. The invention will, therefore, be particularly described with reference to aircraft engines but it is to be understood that the invention is applicable to any system wherein a more accurate indication of speed is desirable.

The aerodynamics of air craft propellers is such that the horsepower to R. P. M. characteristic is exceptionally steep, with a horsepower requirement often as high as the third power of the propeller R. P. M. Because of this condition, errors made in reading the R. P. M. indication of a speed indicator will be magnified two or three times when considered as an indication of engine horsepower; the error increasing with the higher speeds. Conventional indicators having a linear response characteristic must therefore be read within an accuracy of 1% in order to obtain an indication of relative engine horsepower output within a few percent. Hence, it is desirable that the readable accuracy of R. P. M. indicators should increase with increase in indicated speed.

Appreciation of this problem has resulted in the use of specially shaped pole pieces in permanent magnet, movable coil instruments to obtain deflections of the instrument pointer per unit speed of the magneto generator, that increase with increasing speed of the generator. This method has not been entirely satisfactory in view of the high manufacturing costs, the difficulties experienced in the control of the pole piece shapes during manufacture, and the necessity for different pole piece shapes for each ratio of scale expansion.

Objects of the present invention are to provide simple and inexpensive speed responsive indicating or control apparatus including an alternating current generator and an indicating or control instrument with a pointer that is deflected as a more than linear function of the energy output of the generator. An object is to provide an electrical tachometer comprising an alternating current generator and an instrument with a moving system having an angular deflection characteristic that approximates the horsepower characteristic of aircraft engines. An object is to provide an electrical tachometer including a magneto generator, an indicating instrument having a moving system that is deflected as a substantially linear function of the energy input to the instrument, and a transmission line between the generator and instrument that includes a frequency-variant impedance or impedance network; the transmission attenuation of the line varying with the generator speed, and thereby with the frequency of the voltage output of the generator. A further object of the invention is to provide an electrical tachometer including a magneto generator, a direct current measuring instrument, and a network of frequency-variant transmission attenuation between the generator and instrument that includes a rectifier bridge. More specifically, an object is to provide a tachometer of the type last stated in which the rectifier bridge includes two rectifier arms and two capacitive arms.

These and other objects and advantages will be apparent from the following specification when taken in connection with the accompanying drawing. It is to be expressly understood that the drawing is merely for purposes of illustration and is not to be construed as defining the scope of the invention, reference being had for this purpose to the appended claims.

In the drawing wherein like reference numerals refer to like parts:

Figs. 1 and 2 are schematic diagrams of embodiments of the invention that include a direct current indicating instrument;

Fig. 3 is a schematic diagram of a speed responsive control system including a transmission network for a plurality of increases in transmission efficiency with increasing speed;

Fig. 4 is a schematic diagram of another embodiment that is generally similar to the Fig. 3 system; and Fig. 5 is a schematic diagram of a tachometer including an instrument of the iron vane type and a transmission network similar to that of Fig. 4.

The speed responsive indicating and/or control systems include, in common with prior arrangements of the same general character, a small magneto generator for developing an alternating current voltage that varies in magnitude and in frequency with the generator speed, and an instrument or instrument type relay for measuring the current output of the generator. The generator may be of the rotating coil or of the rotating magnet type, and the instrument or relay may be of a true alternating current type or of the "rectifier" type comprising a direct current instrument of the pivoted coil, permanent magnet type and a rectifier bridge. The specific designs of the generator and instrument elements are not essential features of the invention in its broader aspects as the operation of the scale-expanding transmission network of this invention is not dependent upon the physical structures of the generator and the indicator or control members.

In Fig. 1, the reference numeral 1 identifies an engine having a shaft, usually the cam shaft in the case of aircraft engines, to which the shaft 2 of a small magneto generator 3 is connected. The indicating instrument I that is in general use at this time is of the rectifier type and comprises a pivoted coil 4 carrying a pointer 5 that moves along a scale 6, and a rectifier bridge 7 of four rectifier elements 7a–7d. The permanent magnet of the instrument is not illustrated but is preferably of the known type that affords a scale length of the order of 270°. Such direct current instruments are characterized by inherent ruggedness, low energy consumption and high sensitivity. The coil 4 is connected across one set of rectifier bridge terminals by leads 8, 8', and the terminals of generator 3 are connected to the conjugate set of bridge terminals by leads or wires 9, 9'.

The elements, as so far described, have been incorporated in electrical tachometers, and the angular deflection characteristic of the pointer 5 in prior devices has been a linear function of the generator speed as the magnitude of the generator voltage varies directly with the generator speed. In accordance with the present invention, the ratio of the energy input at the indicating instrument to the energy output of the generator 3 is varied with the generator speed by including a frequency-variant impedance in the coupling network, specifically a condenser 10 in series in the lead 9.

The voltage output of generator 3 increases proportionally in both magnitude and frequency with the generator speed, and the impedance of the condenser 10 decreases with increasing frequency. Thus, as the speed of the generator increases, the instrument coil 4 receives an increasing current, this current increase being directly proportional to both the increased magnitude and the higher frequency of the voltage output of the generator. It will, therefore, be seen that the pointer 5 will deflect approximately as the square of the speed of the generator. This condition causes an increasing expansion or opening up of the indicator scale at the upper end, thereby making it possible to read engine R. P. M. with twice the normal accuracy.

As the approach of the indicator deflection to the square law characteristic depends chiefly upon the circuit containing a maximum of capacitive impedance and a minimum of resistance, the circuit of Fig. 2 represents a closer approximation to the ideal condition. In this embodiment of the invention, two of the rectifier elements in the usual four arm rectifier bridge have been replaced by condensers, thereby removing the resistance of the two rectifier elements without any appreciable loss of efficiency. In Fig. 2, the bridge 7', consisting of rectifier elements 7a, 7b and condensers 10c, 10d, serves fully to rectify the alternating current of the generator 3, so that only direct current flows through the instrument coil 4. During one-half cycle the current flow follows the path defined by wire 9, condenser 10d, wire 8, instrument coil 4, wire 8', rectifier element 7b and wire 9'. During the other half-cycle, current flows through wire 9', rectifier element 7a, wire 8, the coil 4, wire 8', condenser 10c and wire 9. Therefore, the current passing through the indicator flows in the same direction for both halves of the alternating current cycle. The value of this current increases as the speed of generator 3 increases due to the increased voltage generated by said generator at the high speeds. Further, as the speed of the generator increases, the frequency of the generated voltage increases, which produces a corresponding decrease in the impedance of the condensers 10c and 10d, thereby permitting more current to flow through indicator coil 4. Thus, by employing an indicator of relatively low resistance and a proper choice of condensers, the deflection of the indicator can be made closely to approximate a square law characteristic. It is to be noted that the relative effect of any errors in the rectifier type instrument is reduced by this expansion of the scale.

It is appreciated, by those familiar with the art, that the inherent limitation to accuracy in a rectifier type instrument is the stability of the rectifier in conjunction with the instrument. However, in systems such as shown in Figs. 1 and 2, the scale distribution is expanded by virtue of the frequency of the generator output, whereas the indicating instrument remains a device responding linearly to the current and affected linearly by the rectifier characteristics. Therefore, any given percentage error caused by the rectifier or the instrument proper, in terms of instrument current response, is reduced in terms of percentage of indicated R. P. M. by the amount that the scale is expanded.

It is sometimes desired to secure deflection characteristics steeper than the square law. Such results may be obtained by cascading the frequency-variant elements in the transmission network between the magneto generator and the instrument that may be of the rectifier type, as previously described, or an electro-dynamometer instrument relay such as illustrated in the control or recording circuit of Fig. 3.

The frequency-variant elements of the transmission network comprise the cascaded condensers 11, 12 in the lead 9, and the shunting resistor 13. The instrument relay R, as shown, has stator windings 15 and a rotor winding 16 carrying a pointer and contact arm 17, the several windings being serially connected across the leads 9, 9'. A pair of relatively stationary contacts 18 are mounted on a base 19 that may be adjusted along the arcuate scale 6' to determine the control point of the system. The contact arm 17 and contacts 18 are connected to a control or recording system 20 that may be of any appropriate type in accordance with the desired control or recording operation.

Analysis of the Fig. 3 circuit will show that, as the speed of the generator 3 increases, the increasing voltage resulting therefrom causes an increasing current to flow through the circuit consisting of generator 3, lead 9, condenser 11, resistance 13 and wire 9'. This current increases exponentially as both the frequency and magnitude of the voltage increase at the higher generator speed, as explained hereinbefore. Such increasing current flow through the resistance 13 results in a correspondingly increased voltage drop or potential across the second stage of the transmission circuit consisting of condenser 12 in series with relay R. By analogy, the potential established across the relay R is also correspondingly increased exponentially with the generator speed as the impedance of the series condenser 12 decreases with increasing frequency. It can therefore be seen that each stage of condenser and resistance amplifies the voltage exponentially as the generator speed increases, resulting in a rapidly expanding scale characteristic in the indicator or control instrument. Additional stages may be added, consistent with efficiency to produce as high an exponent as practical.

As illustrated in Fig. 4, cascaded stages of frequency-variant impedances may be employed with a rectifier bridge 7' of the type previously described with reference to Fig. 2 and a direct current instrument relay comprising a permanent magnet 21 and a pivoted coil 4' carrying a pointer or contact arm 5' that is displaced between relatively stationary relay contacts 18'. The series elements of the cascaded stages are the condensers 11, 12, and the capacitive arms 10c, 10d of the rectifier bridge; and the shunt elements of the cascaded stages are the choke coils 13', 14'. This substitution of choke coils for the shunt resistor of the Fig. 3 circuit results in a more rapid rise of transmission efficiency with frequency, and is therefore to be preferred to the resistive type shunt when permitted by design limitations as to weight and cost.

As shown in Fig. 5, an iron vane type of instrument I' may be coupled to the magneto 3 through a frequency-variant transmission network of the general type of Figs. 3 and 4. The additional condenser 22 that is connected between the choke coil 14' and the winding 23 of the instrument corresponds to the capacitive bridge arms 10c, 10d of the Fig. 4 circuit. The fixed iron member 24 and the pivoted iron vane 25 that carries the pointer 26 may be of any desired design.

It is to be noted that the scale-expansion effect of the frequency-variant transmission network is superposed upon the current-response characteristic of the instrument which may, of itself, be a more or a less than linear function of the generator voltage. For example, the electro-dynamometer type instrument relay R of Fig. 3 has an approximately square law response which, in combination with the illustrated network that has an efficiency that varies approximately as the square of the generator speed, results in a displacement of the contact arm 17 as approximately the fourth power of the generator speed. This marked increase in effective sensitivity makes it practical to obtain, with alternating current instrument relays, an accuracy of recording or control that was previously obtained only with rectifiers and direct current instrument relays. It is to be noted that the scale-expansion characteristic of the transmission network may be in a sense to neutralize, in whole or in part, the scale-expansion characteristic of the instrument per se. For example, a dynamometer type instrument may be given a deflection characteristic that is substantially linear with respect to generator speed by shunting a capactive reactance across the instrument to decrease the transmission efficiency of the network with increasing frequency.

The selection of values for the frequency-variant impedances will depend upon the frequency range of the generator 3, and the following data are given as an example of values that have been found satisfactory under particular design conditions. For engines operating at speeds up to 3000 R. P. M., and with the generator 3 driven from the cam shaft at one-half the engine shaft speed, the generators were of the four pole type producing two cycles per revolution. The frequency range of the circuit was therefore from 0–3000 cycles per minute. In the circuit of Fig. 1, the condenser 10 had a value of 3 microfarads, and in the Fig. 2 circuit, the capacitive bridge elements 10c, 10d were 1.5 microfarads each. In the Fig. 3 circuit, the cascaded series condensers 11, 12 may be 16 microfarads each with shunt resistors 13, 14 of 1,000 ohms each. When the direct current instrument of Fig. 2 is substituted in the Fig. 3 circuit, the capacitive elements 10c, 10d of the rectifier bridge may have values of 8 microfarads each.

The relative expansion of the scale graduations with generator speed depends of course upon the selected values of the frequency-variant impedances, and it is to be understood that the invention is not limited to the particular values herein stated or to those values that will result in the maximum scale expansion in any given speed-responsive indicating or control system. The several illustrated embodiments of the invention indicate that there is considerable latitude in the application of the circuits conforming to this invention and it is to be understood that further variations and adaptations are permissible within the spirit of the invention as set forth in the following claims.

I claim:

1. In a speed-responsive indicating or control system, the combination with a magneto generator developing an alternating current that varies in voltage and in frequency with the generator speed, and an instrument having a moving system that is deflected angularly as a function of the direct current input to the instrument, of a network including a rectifier bridge and a frequency-variant impedance coupling said instrument to said generator, whereby current flow to said instrument is unidirectional and varies with the voltage and with the frequency of the current output of the generator.

2. In a speed-responsive indicating or control system, the invention as claimed in claim 1, wherein the rectifier bridge includes two rectifying arms and two capacitive arms.

3. A speed-responsive indicating or control system comprising a magneto generator, an instrument having a moving system that deflects angularly as a substantially linear function of the current input to the instrument, and a network of frequency-variant transmission attenuation coupling said instrument to said generator, said network including a plurality of cascaded stages of reactive impedance for decreasing the transmission attenuation with increasing frequency, whereby the angular deflection of the instrument moving system for equal increments of generator speed increases with the generator speed.

4. A speed-responsive indicating or control system as claimed in claim 3, wherein said instrument comprises a relay having contacts for connection to a controlled circuit.

5. In a tachometer, a magneto generator developing an alternating current voltage that varies in magnitude and in frequency with the generator speed, a measuring instrument having a moving system that deflects angularly as a substantially linear function of the current input to the instrument, said moving system including a pointer for cooperation with a scale having unit graduations of a length that increases substantially progressively towards the upper end of the scale, and a network coupling said instrument to said generator, said network including reactive impedance for decreasing the transmission attenuation with increasing frequency, whereby the angular deflection of the instrument moving system for equal increments of generator speed increases with the generator speed.

6. In a tachometer, a magneto generator, a direct current instrument of the pivoted coil permanent magnet type, said instrument including a pointer carried by the coil and movable over a scale having unit graduations of a length that increases substantially progressively towards the upper end of the scale, and a network coupling said instrument coil to said generator, said network including a rectifier bridge and reactive impedance decreasing the transmission attenuation of the network with increasing frequency.

7. In a tachometer, the invention as claimed in claim 6, wherein said reactive impedance is a capacitive reactance in series between the generator and the rectifier bridge.

8. In a tachometer, the invention as claimed in claim 6, wherein said rectifier bridge has two rectifying and two capacitive arms.

9. In a tachometer, the invention as claimed in claim 6, wherein said rectifier bridge has two rectifying and two capacitive arms, and said reactive impedance includes said capacitive bridge arms and reactance between said generator and said bridge.

10. In a tachometer, the invention as claimed in claim 6, wherein said rectifier bridge has two rectifying and two capacitive arms, and said reactive impedance includes said capacitive bridge arms and a plurality of cascaded stages of frequency-variant impedance between said generator and said bridge.

11. In a speed-responsive indicating or control system, a magneto generator developing an alternating current voltage that varies in magnitude and in frequency with the generator speed, a direct current instrument relay having contacts for connection to a controlled circuit, a network having a transmission attenuation that decreases with increasing frequency and including a rectifier bridge and a frequency-variant impedance coupling said instrument relay to said generator, said impedance having a transmission attenuation that decreases with frequency.

ROSWELL W. GILBERT.